Figure 1:
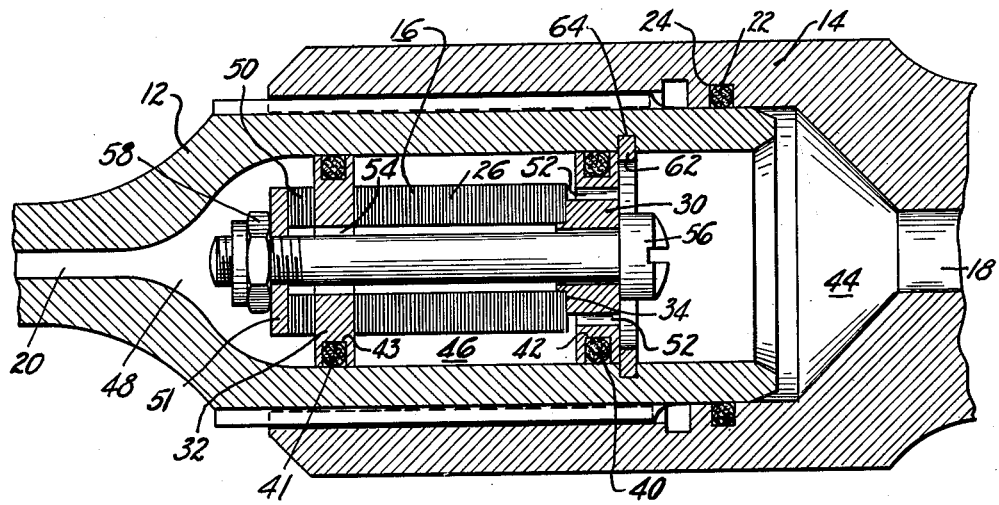

April 21, 1953  W. KASTEN  2,635,641

FLUID FILTERING AND METERING DEVICE

Filed Dec. 22, 1947

INVENTOR
WALTER KASTEN
BY M. A. Hobbs
ATTORNEY

Patented Apr. 21, 1953

2,635,641

UNITED STATES PATENT OFFICE 2,635,641

FLUID FILTERING AND METERING DEVICE

Walter Kasten, Detroit, Mich., assignor to Bendix Aviation Corporation, South Bend, Ind., a corporation of Delaware Application December 22, 1947, Serial No. 793,303

8 Claims. (Cl. 138—41)

The present invention relates to a fluid flow control system and more particularly to a fluid filtering and metering device in a fluid system.

In conventional fluid metering systems wherein a relatively small orifice is used to control the fluid flow, difficulty is sometimes encountered in preventing the orifice from becoming obstructed by impurities in the fluid. This may occur even though the fluid has been filtered anterior to the metering orifice by a filtering element having a consistently smaller pore size than the size of said orifice, since unfilterable particles passing through the filtering element may agglomerate and thus form a mass too large to pass through the metering orifice or they may accumulate around the orifice and restrict the flow of fluid therethrough. It is therefore one of the principal objects of the present invention to provide a fluid metering device adapted to meter relatively small quantities of fluid over long periods of time without becoming obstructed or appreciably restricted by impurities in the fluid.

Another object of the invention is to provide a novel device for metering small quantities of fluid, which can be readily incorporated in a fluid system normally using a conventional metering orifice without necessitating any radical changes in said system.

A further object of the invention is to provide a compact fluid filtering and metering device which can be adjusted to vary simultaneously the characteristics of the filtering and metering elements.

Figure 2:
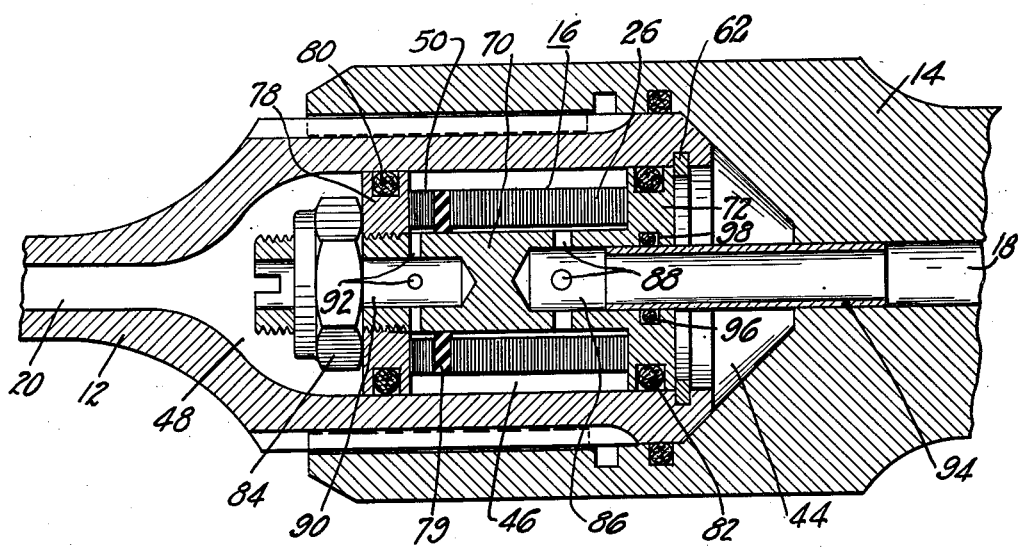

Further objects and advantages will be apparent from the following description and accompanying drawings, wherein two specific embodiments of the fluid filtering and metering device are given. In the drawings:

Figure 1 is a vertical cross-section of the present fluid filtering and metering device showing said device assembled in a fluid supply line; and Figure 2 is a vertical cross-section of a modified form of the present fluid filtering and metering device assembled in a fluid supply line.

Referring more specifically to the drawings, numeral 12 designates the male portion of a hollow spline shaft, numeral 14 the female portion thereof, and 16 a fluid filtering and metering device mounted in an enlarged section or compartment of the hollow interior of said shaft, said hollow interior forming a conduit for a fluid, such as a lubricating oil delivered from the lubricating system of an engine to the bearings of a generator driven by said engine through the spline shaft. In the construction shown in the drawings, the fluid flows from right to left, entering the enlarged section of the hollow shaft interior at 18 and leaving at 20. The two portions of the spline shaft are sealed in fluid-tight relationship by an annular sealing ring 22 inserted in an internal groove 24 of female portion 14.

The fluid filtering and metering device, generally shown at numeral 16, includes a hollow fluid filtering element 26, preferably of the edge type, supported between an end plate 30 and a partition 32 and held in alignment with the axis of said end plate by an annular shoulder 34 on the internal surface of said plate. End plate 30 and partition 32 are provided with sealing rings 40 and 41 seated in annular grooves 42 and 43, respectively, for maintaining a fluid-tight relationship between the internal wall of the hollow interior and the peripheries of said end plate 30 and partition 32. Thus the enlarged section of the spline shaft is divided into a fluid inlet chamber 44, filter chamber 46 and a fluid outlet chamber 48. A hollow metering element 50 is mounted in alignment with the filtering element 26 on the opposite side of partition 32 and is closed on the end opposite said partition by a sealing plate 51. A plurality of fluid passages 52 are provided in end plate 30 and a large central hole 54 is provided in partition 32 to permit the fluid to pass from chamber 44 into chamber 46 and thence into chamber 48. The assembly consisting of end plate 30, filter element 26, partition 32, metering element 50 and sealing plate 51, is held rigidly in its assembled position by a bolt 56 which passes through a central hole in plate 30, the internal chamber of the filtering and metering elements and through the central hole in partition 32 and sealing plate 51. This bolt, together with a nut 58, serves as a means for adjusting the size of the pores of the filtering and metering elements. For example, the pore size of the two elements is decreased when said elements are compressed by the tightening of nut 58 and increased when said elements expand on the loosening of said nut. When the various parts of the fluid filtering and metering unit have been assembled on bolt 56 and secured thereon by nut 58, the unit is inserted in the enlarged portion of the spline shaft and secured therein by locking ring 62 which seats in annular groove 64 and thus prevents any appreciable axial movement of said unit in the enlarged interior portion of the shaft.

The filtering element 26 and the metering element 50 are preferably of the same general construction and may consist of a plurality of washer-like layers, either as individual layers or as the convolutions of a helically wound unit, having radial pores between each layer to provide passages for the fluid being filtered and metered. The layers of the filtering and metering elements may be of a fibrous material held together by a discontinuous bond so distributed that radial pores are formed between the layers at frequent intervals. The discontinuity of the bond may be controlled by using a paper or fibrous material having a predetermined rugosity on both surfaces thereof so that the valleys of the rugosities form the passages and the peaks thereof form the points of contact between the adjacent layers.

In the operation of the device shown in Figure 1, fluid, such as oil under pressure from the oil pump of an engine is forced through the shaft into inlet chamber 44. The fluid then passes through orifices 52 into filter chamber 46, thence through filter element 26 into the internal portion thereof. This filtered fluid flows through the central opening 54 of partition 32 into the internal portion of metering element 50. The fluid then passes slowly through the metering element into outlet chamber 48 and thence through the outlet passage 20. In this arrangement it is seen that the fluid before passing through the metering element is filtered by an element of a pore size at least as small as the pore size of the metering element so that the particles of foreign matter entrained in the fluid will be removed before the metering element is reached. Most of the foreign matter will collect on the exterior surface of filtering element 26 which has a much greater area than the internal surface of metering element 50. The metering of the fluid by element 50 is accomplished by seepage of the fluid through pores over an extensive area of the internal surface of said element; consequently, the accumulation or agglomeration of fine particles of foreign matter on said area does not materially restrict or obstruct the relatively slow flow of fluid through the metering element.

The construction of the fluid filtering and metering device shown in Figure 2 is similar in many respects to that shown in Figure 1, thus the same numerals will be used on identical parts appearing in both embodiments. The spline shaft is provided with a compartment for receiving the fluid filtering and metering device and includes an internal passageway having fluid inlet 18 and a fluid outlet 20 for said compartment. The fluid filtering and metering device generally shown at 16 has a core 70 with an enlarged end 72 forming an end plate comparable to that shown at 30 in Figure 1. Another end plate 78 is mounted on core 70. These two end plates are sealed in fluid-tight relationship with the wall of the compartment by annular gaskets 80 and 82, respectively, to divide said compartment into inlet chamber 44, filter chamber 46 and fluid outlet chamber 48, as in Figure 1. The filter element 26 and metering element 50 are separated from one another by a partition 79 which is preferably constructed of rubber or similar material and is fitted snugly around core 70 to prevent the fluid from flowing from the internal portion of the filtering element to the internal portion of the metering element without first passing through said elements. A nut 84 is threaded onto core 70 to rigidly secure end plate 78 and the filtering and metering elements in their assembled position. A recess 86 and ports 88 are provided in the inlet end of the core for receiving the fluid from inlet 18 and delivering it to the internal portion of the filtering element. Another recess 90 and cooperating ports 92 are provided in the outlet end of said core for receiving fluid from the internal portion of the metering element and delivering it to chamber 48. As shown in Figure 2, a tube 94 is provided to connect inlet 18 with recess 86 and is preferably sealed in fluid-tight relationship with said recess by a gasket 96 seated in annular groove 98 of support member 70. The fluid filtering and metering unit is held in operative position in the enlarged portion of the spline shaft by locking ring 62 similar to that shown in Figure 1. The filtering and metering elements of the modification shown in Figure 2 are of the same general construction as those of Figure 1.

In the operation of the device shown in Figure 2, the fluid such as oil flows through inlet 18, tube 94, recess 86 and orifices 88 into the internal portion of filtering element 26. After the fluid has passed through the filtering element, it flows through the metering element, thence through orifices 92 into recess 90 and passes from the filtering and metering unit through chamber 48 and outlet 20. The pore size of the filtering and metering elements is controlled by the same method as that described in connection with Figure 1. To increase or decrease the compression on said elements, nut 84 is either tightened or loosened.

It is contemplated that other arrangements of elements than those shown in the accompanying drawings may be made without departing from the scope of the present invention. For example, the filtering and metering elements may be mounted in the fluid passageway at widely separated points, or in certain applications, the metering element may be used alone in the passageway. Additional modifications of the present fluid filtering and metering device as well as other uses therefor will occur to those skilled in the art.

I claim:

1. A device for filtering and metering fluid in a passageway comprising a cylindrical filtering element of compressible material having radial pores therein; a metering element of compressible material axially aligned with and operatively disposed downstream from said filtering element and composed of a plurality of washer-like layers having radial pores therebetween; a partition having a centrally located hole therethrough between said elements; imperforate end plates on said elements opposite said partition, said partition and plates being so constructed and arranged that the fluid first passes through said filtering element and then through said metering element; and a means for varying the pore size of said elements.

2. A device for filtering and metering fluid in a passageway comprising an edge type filtering element of compressible material having radial pores therein disposed in said pasasgeway; a hollow metering element of compressible material disposed in said passageway downstream from said filtering element and composed of a plurality of axially arranged layers having radial pores therebetween; a partition having a centrally located hole therethrough between said elements; imperforate end plates on said elements opposite said partition, said partition and plates being so constructed and arranged that the fluid first passes through said filtering element and then through said metering element; and means adapted to apply pressure simultaneously to said elements for varying the flow capacity thereof.

3. A device for filtering and metering fluid in a passageway comprising a hollow edge type filtering element of compressible material having radial pores therein; a hollow cylindrical metering element of compressible material axially aligned with and operatively disposed downstream from said filtering element, said metering element being composed of a plurality of axially arranged layers having radial pores therebetween; a partition between said elements having an orifice connecting the internal portion of said elements, said partition being adapted to form a fluid-tight relationship with the side walls of said passageway; plates closing the ends of said elements opposite said partition whereby the fluid being filtered and metered passes inwardly through the filtering element into the internal portion thereof, then through the orifice of the partition into the internal portion of the metering element and outwardly through said metering element; and means adapted to apply pressure simultaneously to said elements for varying the flow capacity thereof.

4. A device for filtering and metering fluid in a passageway comprising a hollow cylindrical filtering element of compressible material having radial pores therein, disposed in said passageway and spaced from the side walls thereof; a hollow cylindrical metering element of compressible material disposed in said passageway downstream from said filtering element, said metering element being composed of a plurality of washer-like layers having radial pores therebetween; a partition between said elements having an orifice connecting the internal portion of said elements, said partition forming a fluid-tight relationship with the side walls of said passageway; plates closing the ends of said elements opposite said partition; and means extending axially through said plates, filtering and metering elements, and said orifice, and having an adjustable member thereon for simultaneously varying the pore size of said elements.

5. A device for filtering and metering fluid in a passageway, the combination of a filtering element having radial pores therein; a hollow metering element axially aligned with and operatively disposed downstream from said filtering element and composed of a plurality of axially arranged layers having radial pores therebetween connecting the internal portion of said element with the surface thereof; and a means for applying pressure to said elements to vary the flow capacity of said radial pores.

6. A device for filtering and metering fluid in a passageway comprising a core; a hollow cylindrical filtering element having radial pores and mounted on said core in spaced relation therefrom; a hollow cylindrical metering element having radial pores and mounted on said core and spaced therefrom, said metering element being composed of a plurality of axially arranged layers having radial pores therein; a partition between said elements forming a fluid-tight relationship with said core; end plates opposite said partition having central passages therethrough communicating with the internal portion of said elements, said plates forming an external chamber about said elements whereby the fluid being filtered and metered passes outwardly through the filtering element into said external chamber and then inwardly through the metering element and a means on said core adapted to adjust simultaneously the pore size of said element by applying end pressure thereto.

7. A device for filtering and metering fluid in a passageway comprising a core; a hollow cylindrical metering element having radial pores and being mounted on said core in spaced relation therefrom and adapted to be spaced from the side walls of said passageway; a hollow cylindrical metering element mounted on said core and spaced therefrom and adapted to be spaced from the side walls of said passageway, said metering element being composed of a plurality of axially arranged layers having radial pores therebetween; a partition between said elements forming a fluid-tight relationship with said core and adapted to be spaced from the side walls of said passageway; end plates opposite said partition having central passages therethrough communicating with the internal portion of said elements, said plates being adapted to engage the side walls of said passageway in fluid-tight relationship to form an external chamber about said elements whereby the fluid being filtered and metered passes outwardly through the filtering element into said external chamber and then inwardly through the metering element; and a means cooperating with said core for adjusting simultaneously the pore size of said elements by applying end pressure thereto.

8. A device for filtering and metering fluid in a passageway comprising a core; a hollow cylindrical filtering element having radial pores and being mounted on said core in spaced relation therefrom and adapted to be spaced from the side walls of said passageway; a hollow cylindrical metering element mounted on said core and spaced therefrom and adapted to be spaced from the side walls of said passageway, said metering element being composed of a plurality of axially arranged layers having radial pores therebetween; a partition between said elements forming a fluid-tight relationship with said core and adapted to be spaced from the side walls of said passageway; plates opposite said partition having central passages therethrough communicating with the internal portion of said elements, said plates being adapted to engage the side walls of said passageway in fluid-tight relationship to form an external chamber about said elements; and a means cooperating with said core to vary simultaneously the pore size of said elements.

WALTER KASTEN.

References Cited in the file of this patent

UNITED STATES PATENTS

| Number | Name | Date |
|---|---|---|
| 1,581,998 | Fulcher | Apr. 20, 1926 |
| 2,042,462 | Hahn | June 2, 1936 |
| 2,118,295 | Crawford et al. | May 24, 1938 |
| 2,119,288 | Raymond | May 31, 1938 |
| 2,265,550 | Smith | Dec. 9, 1941 |
| 2,511,733 | Morrison | June 13, 1950 |